Patented Apr. 14, 1925.

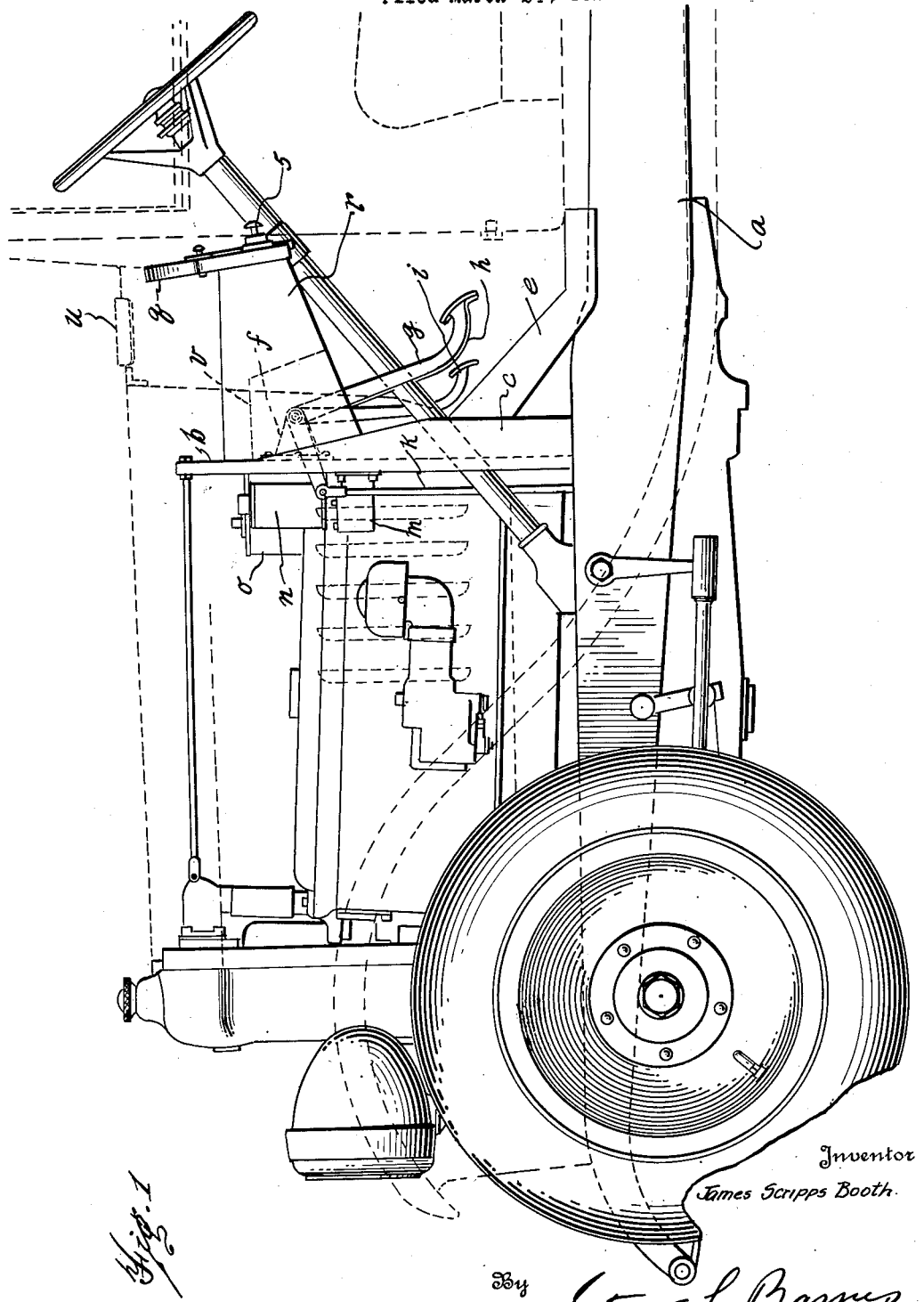

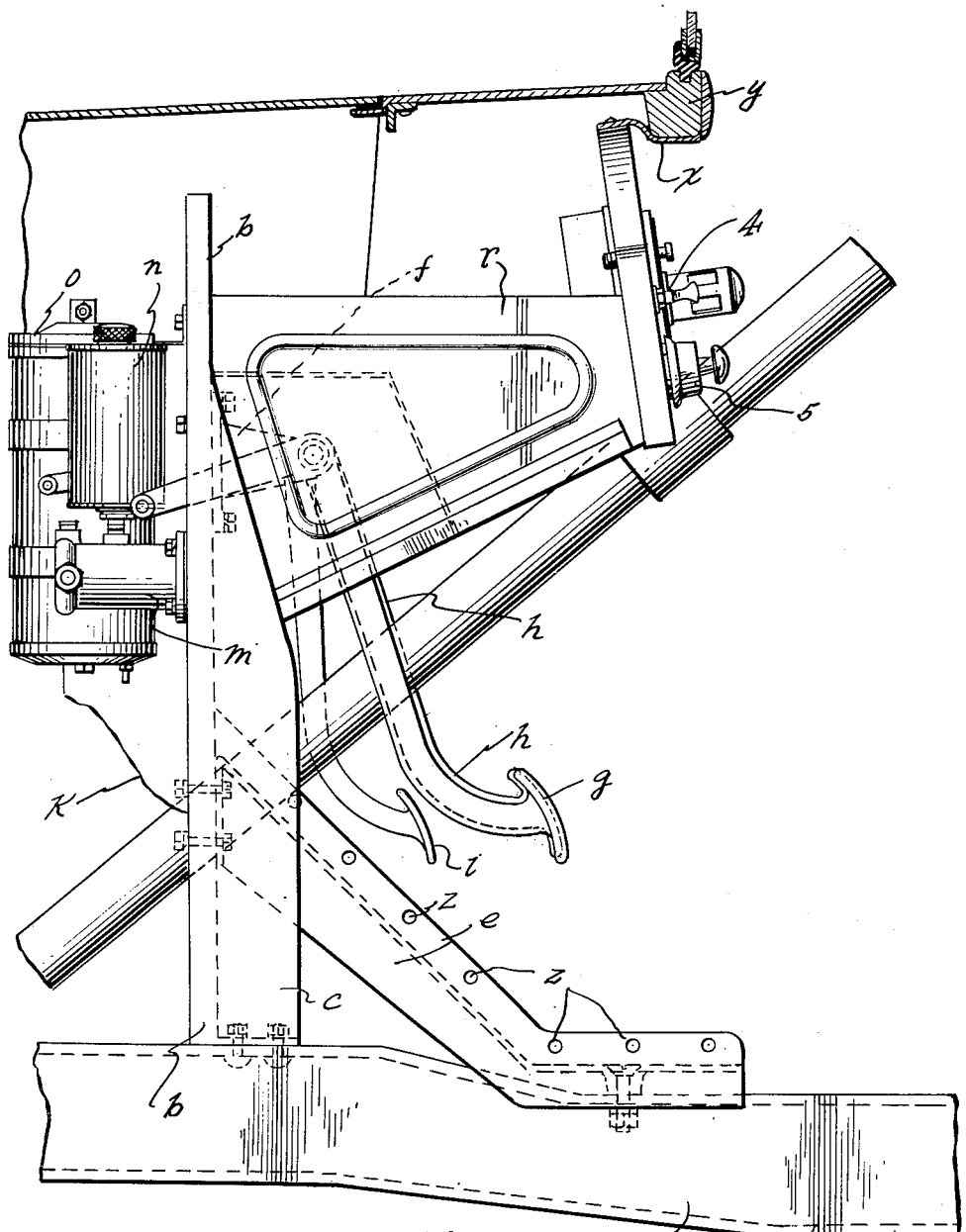

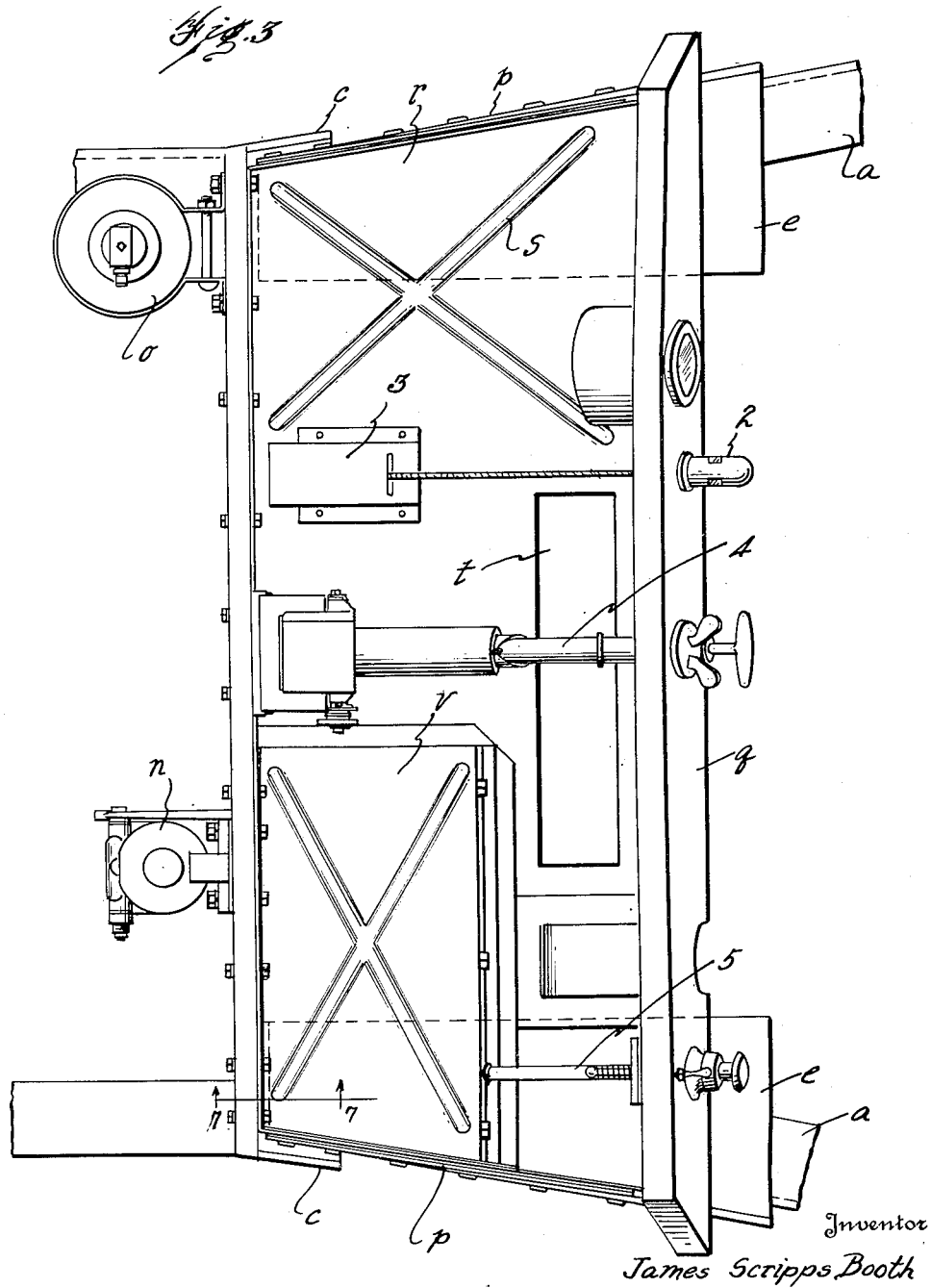

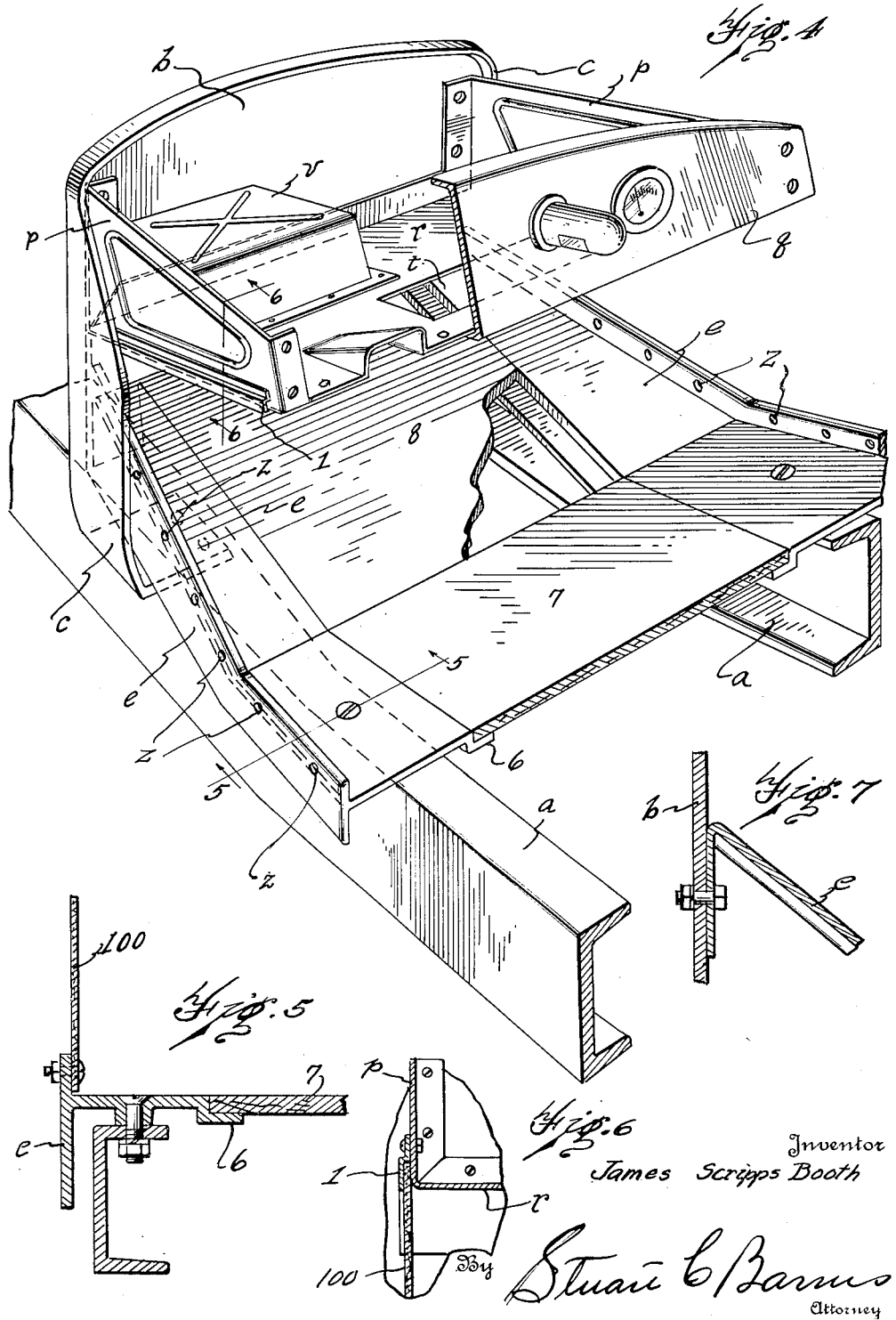

UNITED STATES PATENT OFFICE.

JAMES SCRIPPS BOOTH, OF DETROIT, MICHIGAN.

AUTOMOBILE DASH AND BODY CONSTRUCTION.

Application filed March 24, 1924. Serial No. 701,566.

*To all whom it may concern:*

Be it known that JAMES SCRIPPS BOOTH, a citizen of the United States, residing at Detroit, in the county of Wayne and State of Michigan, has invented certain new and useful Improvements in Automobile Dash and Body Constructions, of which the following is a specification.

This invention relates to automobiles and has for its object an improved dash-cowl-hood tool box arrangement.

The dash contrary to the usual practice, is constructed as a stiff rigid upright member arranged to carry some of the operating devices of the car, such as the foot controls, etc. The instrument board is supported by the dash, and intervening between the instrument board and the dash, is a tool box. The division line between the hood and cowl is located further back than is usual so that, when the hood is opened, the tool box is exposed through the hood opening so that the tools are handy for use on the motor. Furthermore, this arrangement makes the back of the instrument board accessible through the hood opening so that the binding posts, wires, etc., usually located on the instrument board are easily accessible.

These and other features will more fully appear from the description which follows:

Fig. 1 is a side elevation of the chassis frame motor, etc., the body parts being shown in dotted lines.

Fig. 2 is an enlarged side elevation of the dash and some of the surrounding parts.

Fig. 3 is a plan view of the dash, tool box and instrument board.

Fig. 4 is a perspective view of the instrument board, dash, a portion of the chassis frame, the foot and toe boards, etc.

Fig. 5 is a cross section taken on the line 5—5 of Fig. 4.

Fig. 6 is a section taken on the line 6—6 of Fig. 4.

Fig. 7 is a section taken on the line 7—7 of Fig. 3.

The channel sills *a—a* of the chassis frame support the dash *b* which is preferably an aluminum casting. This casting is provided with side flanges *c* and rearwardly extending inclined braces *e* having their front ends bolted to the back of the dash and having their lower ends bolted to the top flanges of the sill board. This makes a very rigid construction and enables the dash to support the operating parts now to be described.

The supporting bracket *f* is bolted to the inner side of the dash and on this are pivoted the three operating pedals of the car, to wit: the clutch pedal *g*, the brake pedal *h* and the accelerator pedal *i*. The clutch pedal *g* is connected through the draft link *k* with the clutch not shown. The brake pedal *j* is connected with the hydraulic cylinder *m*, which, through suitable connections not shown, operates the brakes. *n* designates the hydraulic reservoir, *o* the vacuum fuel feed tank.

Secured to the sides of the dash are the sheet metal plates *p* which form supports at their forward ends for the instrument board *q*. These plates support also the bottom plate *r* which is suitably ribbed as at *s* to prevent drumming noises. An opening *t* is provided at the bottom of the plate to let the air through from the ventilator *u* in the cowl; a shelf *v* is provided in the lower right hand corner to clear the tops of the operating levers. This forms a box which can be utilized as a tool box.

Referring to Fig. 1 it will be seen that the division line between the cowl and the hood is almost above the middle of this box. The result is that when the hood is lifted the box is accessible from the hood opening so that the tools may be readily used on the motor and the accessories attached to the motor. This makes a very convenient arrangement and gives access to the tools in much easier fashion than storing them under the seat or some other such place.

The instrument board as already stated, is hung on the front ends of the side plates *p*. A piece of trimming *x* extends around the windshield sill *y* and over the top of the instrument board to make a clean joint here. The side flange of the rearwardly inclined braces *e* are provided with perforations *z* by which trimming 100 (Fig. 5) may be fastened to the inclined strip at the bottom and to the trim strip 1 (Fig. 6) that is riveted to the supporting plate. 2 designates a trouble lamp the cord of which is wound up in the housing 3 supported in the tool box. 4 and 5 designate control devices supported upon the instrument board and which have stems, etc., running through the tool box. Inasmuch as details of these control devices are not material they are not given.

It will be noticed that the inside of the rearwardly inclined braces have steps 6 upon which the foot board 7 and toe board 8 are supported.

What I claim is:

1. The combination of a chassis frame, sheet metal body construction, a heavy cast metal dash rigidly bolted to the chassis frame independently of the body structure, said body structure arranged to be fitted over the chassis frame and the dash, and one or more foot levers pivotally supported from the dash near the top and having their foot-engaging portions hung below the fulcrums of the levers.

2. In automobile construction, the combination of a chassis frame, a dash supported upon the chassis frame, a tool box supported on the dash behind the same, a hood and cowl supported above the dash and having the division line between the two substantially behind the dash whereby access to the tool box is given through the hood opening, an instrument board supported to the rear of the dash, and a plate connecting the dash and instrument board and forming a tool chamber.

3. In automobile construction, the combination of a chassis frame, a dash supported upon the chassis frame, plates extending rearwardly, an instrument board supported upon the plates, a bottom plate connecting the first mentioned plates forming a tool box, a hood and cowl located above these plates and having the division line between the same substantially behind the dash for the purpose of giving access to the tool box and the rear of the instrument board through the hood opening.

4. In automobile construction, the combination of a chassis frame, a dash supported upon the chassis frame, a cowl and hood supported above the dash with a division line between the two to the rear of the dash to give access to the back of the dash and instrument board through the hood opening, and a tool box supported on the back of the dash and having the rear thereof forming the instrument board of the car.

5. In automobile construction, the combination of a chassis frame, a dash supported upon the chassis frame, a hood and cowl supported above the dash with the division line to the rear of the dash to give access to the rear of the dash through the hood opening, a plurality of plates forming a tool box on the back of the dash and supporting and forming the instrument board, said plates provided with a shelf constructed at one corner, and one or more operating pedals pivotally hung on the dash under said shelf.

6. In automobile construction, the combination of a chassis frame, a dash in the form of a cast metal member rigidly supported upon the chassis frame, a pair of side plates secured to the rear of the dash, an instrument board carried on the rear end of said side plates and a web-like member permanently connecting the bottoms of the plates and the bottom of the instrument board with the dash to form a tool box substantially as described.

In testimony whereof I affix my signature.

JAMES SCRIPPS BOOTH.